(12) United States Patent
Bao et al.

(10) Patent No.: US 11,211,798 B2
(45) Date of Patent: Dec. 28, 2021

(54) POWER CONTROL METHOD, DEVICE AND SYSTEM FOR WIND POWER STATION

(71) Applicant: BEIJING GOLDWIND SCIENCE & CREATION WINDPOWER EQUIPMENT CO., LTD., Beijing (CN)

(72) Inventors: Xianwen Bao, Beijing (CN); Yuan Qiao, Beijing (CN); Yi Zhang, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 100 days.

(21) Appl. No.: 16/616,961

(22) PCT Filed: Sep. 21, 2018

(86) PCT No.: PCT/CN2018/107073
§ 371 (c)(1),
(2) Date: Nov. 25, 2019

(87) PCT Pub. No.: WO2019/192151
PCT Pub. Date: Oct. 10, 2019

(65) Prior Publication Data
US 2020/0259334 A1     Aug. 13, 2020

(30) Foreign Application Priority Data
Apr. 3, 2018    (CN) .......................... 201810290931.8

(51) Int. Cl.
*H02J 3/38* (2006.01)
*H02J 3/12* (2006.01)
*H02J 3/48* (2006.01)

(52) U.S. Cl.
CPC ................ *H02J 3/381* (2013.01); *H02J 3/12* (2013.01); *H02J 3/48* (2013.01); *H02J 2203/20* (2020.01); *H02J 2300/28* (2020.01)

(58) Field of Classification Search
CPC ...... H02J 3/381; H02J 3/12; H02J 3/48; H02J 2300/28; H02J 2203/20; H02J 3/46;
(Continued)

(56) References Cited

U.S. PATENT DOCUMENTS 8,275,489 B1 * 9/2012 Devine ................... F03D 9/255
                                                            700/287
9,450,416 B2    9/2016 Ma et al.
(Continued)

FOREIGN PATENT DOCUMENTS

CN    101931241 A    12/2010
CN    102400855 A    4/2012
(Continued)

OTHER PUBLICATIONS

European Search Report from corresponding European Application No. 18913775.5 dated Mar. 15, 2021 (7 pages).
(Continued)

*Primary Examiner* — Ziaul Karim
(74) *Attorney, Agent, or Firm* — Bayes PLLC

(57) ABSTRACT

The present invention provides a power control method, device and system for a wind power station. The power control method comprises: obtaining running state data of the wind power station and a grid connection point in real time; determining whether the state of the grid connection point meets conditions of secondary frequency modulation according to the running state data; if it is determined that the state of the grid connection point meets the conditions of secondary frequency modulation, determining a limited power instruction value according to a pre-obtained theo-
(Continued)

retical power value of the wind power station, a given value of automatic power generation control, and a standby active power value reserved for primary frequency modulation; and generating and sending an instruction used for controlling the active power of the wind generating set of the wind power station according to the limited power instruction value.

17 Claims, 4 Drawing Sheets

(58) Field of Classification Search
CPC ........ H02J 3/24; H02J 3/386; H02J 13/00019; Y02E 10/76
See application file for complete search history.

(56) References Cited

U.S. PATENT DOCUMENTS

| | | | |
|---|---|---|---|
| 9,690,267 B2 | 6/2017 | Haj-Maharsi et al. | |
| 2014/0039699 A1* | 2/2014 | Forbes, Jr. | ........ H02J 13/00026 |
| | | | 700/286 |
| 2015/0022007 A1* | 1/2015 | Ma | ........................... H02J 3/381 |
| | | | 307/84 |
| 2015/0112497 A1* | 4/2015 | Steven | ................... G06Q 10/04 |
| | | | 700/291 |
| 2016/0146188 A1* | 5/2016 | Matsuda | ............... F03D 1/0675 |
| | | | 416/146 R |

FOREIGN PATENT DOCUMENTS

| | | | | |
|---|---|---|---|---|
| CN | 105449722 A | | 3/2016 | |
| CN | 104767205 B | | 2/2017 | |
| CN | 106505613 A | | 3/2017 | |
| CN | 106953363 A | | 7/2017 | |
| CN | 105449701 B | * | 2/2018 | ............... H02J 3/24 |
| CN | 105449701 B | | 2/2018 | |
| CN | 108336761 A | | 7/2018 | |

OTHER PUBLICATIONS

First Examination Report issued in corresponding India Application No. 201917048606, dated Jun. 21, 2020, 5 pages.
International Search Report and Written Opinion in corresponding PCT Application No. PCT/CN2018/107073, dated Jan. 14, 2019, 9 pages.
Optimization of Primary Frequency Modulation and Secondary Frequency Modulation Strategy for Generator Unit, Mar. 2015, 52 pages.

* cited by examiner

POWER CONTROL METHOD, DEVICE AND SYSTEM FOR WIND POWER STATION

RELATED APPLICATIONS

This application is the national phase of International Application No. PCT/CN2018/107073, titled "METHOD, DEVICE AND SYSTEM FOR CONTROLLING POWER OF WIND FARM", filed on Sep. 21, 2018, which claims the priority to Chinese Patent Application No. 201810290931.8, titled "METHOD, DEVICE AND SYSTEM FOR CONTROLLING POWER OF WIND FARM", filed on Apr. 3, 2018, both of which are incorporated herein by reference in their entirety.

FIELD

The present disclosure relates to technology of control on grid-connection of wind farms, and more particularly, to a method, a device and a system for controlling power of a wind farm.

BACKGROUND

As a clean and renewable energy source, wind energy has a positive effect on increasing energy supply, adjusting energy structure and protecting the ecological environment.

With an increasing penetration of new energy turbines, large-scale new energy stations are connected to a power grid, and bring new challenges to safe, stable and efficient operation of a power system.

For a conventional steam turbine, inertia is an inherent characteristic. In comparison, a new energy turbine generally uses a power electronic converter for grid connection. The power electronic converter in grid-connection has a fast response, and does not have the inertia and damping that are required to maintain safe and stable operation of the system, thereby lacking an effective mechanism for stability support. A total moment of inertia of the system decreases in a case that a large scale of new energy turbines is connected into the power grid, affecting a dynamic frequency response of the system, and greatly reducing stability of the power grid. Thereby, there is a heavy curtailment and restriction on wind power at present.

In a case that the wind farm has schedulable power and is able to participate in partial voltage regulation and frequency modulation of the power system, stability of the system would be increased, grid-connection "friendliness" of wind power would be increased, and thereby penetration of wind turbines would be increased in the power grid. Currently, wind power suppliers mainly adopt following two methods to meet a technical requirement on primary frequency modulation of the power grid.

A first method is to implement a function of the primary frequency modulation of the turbine based on an original energy management platform. The method has following drawbacks. Communication speed designed for the original energy management platform is slow, and accuracy in collecting frequency and a period for measuring frequency at the grid-connection point cannot meet the requirement, thereby directly affecting an effect of the primary frequency modulation.

A second method is to implement the function of the primary frequency modulation of the turbine by using a newly developed device for controlling active power in cooperation with the original energy management platform. The method has following drawbacks. The primary frequency modulation and secondary frequency modulation are required to be controlled in coordination, and have data interactions and some overlapped functions.

In summary, the traditional wind farm energy management platform needs to meet an AGC (Automatic Generation Control) instruction so as to equalize real-time active power outputted from the grid-connection point as scheduled, and does not consider backup active power required by the wind farm for participating in the primary frequency modulation. Stability of the whole system is poor, and penetration of wind turbines of wind farms is low.

SUMMARY

A method for controlling power of a wind farm is provided according to an aspect of the present disclosure. The method includes:
 acquiring, in real time, operation state data of the wind farm and operation state data of a grid-connection point;
 determining, according to the operation state data, whether a state of the grid-connection point satisfies a condition for secondary frequency modulation;
 determining limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation; and
 generating and transmitting an instruction for controlling active power of a wind turbine of the wind farm based on the limiting power for instruction.

A device for controlling power of a wind farm is provided according to another aspect of the present disclosure. The device includes:
 a data acquisition module, configured to acquire, in real time, operation state data of the wind farm and operation state data of a grid-connection point;
 a determination module, configured to determine, according to the operation state data, whether a state of the grid-connection point satisfies a condition for secondary frequency modulation;
 a power instruction determination module, configured to determine limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation; and
 a power control instruction output module, configured to generate and transmit an instruction for controlling active power of a wind turbine of the wind farm, based on the limiting power for instruction.

A system for controlling power of a wind farm is provided according to still another aspect of the present disclosure. The system includes a power control device, and multiple wind turbine controllers associated with multiple wind turbines, respectively, where: each of the multiple wind turbine controllers is connected to the power control device; the power control device is connected to a grid-connection point of the wind farm; and the power control device is configured to acquire, in real time, operation state data of the wind farm and operation state data of a grid-connection point, determine, according to the operation state data, whether a state of the grid-connection point satisfies a condition for secondary frequency modulation, determine limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation, and generate and transmit an instruction for controlling active power of a wind turbine of the wind farm, based on the limiting power for instruction.

According to the present disclosure, the wind farm station has a characteristic of fast frequency response, can improve the stability of the system, and thereby can improve penetration of the wind turbines in the wind farm.

BRIEF DESCRIPTION OF THE DRAWINGS

The above and/or additional aspects and advantages of the present disclosure would be apparent and readily understood in conjunction with following drawings.

DETAILED DESCRIPTION

Figure 1:
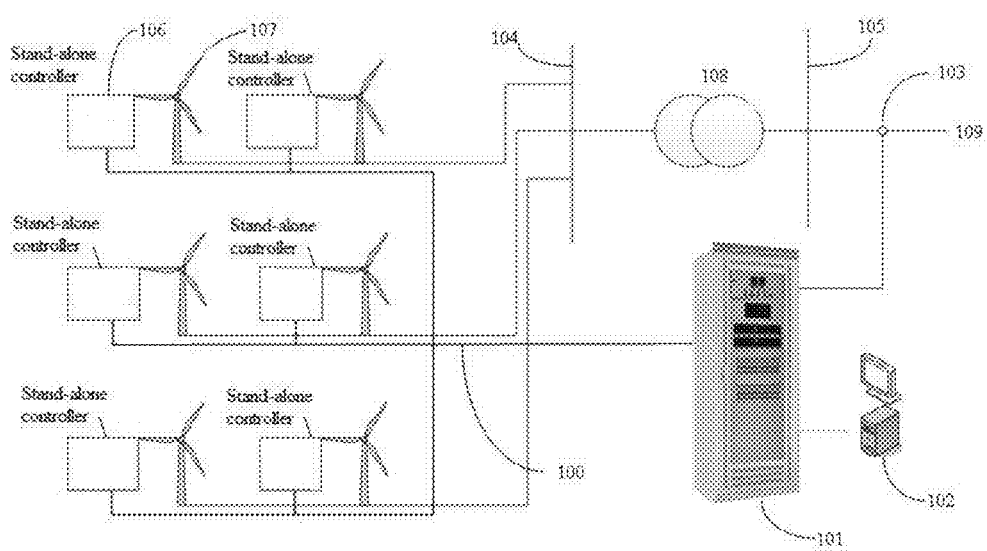
FIG. 1 is a diagram of a basic configuration of an example of a system for controlling power of a wind farm according to an embodiment of the present disclosure.

Hereinafter embodiments of the present disclosure are described in detail, and examples of the embodiments are illustrated in the drawings. The same or similar reference numerals refer to the same or similar elements or elements having the same or similar functions. The embodiments described hereinafter with reference to the drawings are illustrative and used to explain the present disclosure, and not to limit the present disclosure.

Those skilled in the art can appreciate that all terms (including technical terms and scientific terms) used herein, unless otherwise defined, have the same meaning as understood by those ordinary skilled in the art. It should be understood that, unless specifically defined, terms such as those defined in the general dictionary should be understood as having a meaning in consistent with the meaning in the context of the related art, and should not be interpreted in an idealized or overly formal meaning.

Hereinafter some technical terms used in the embodiments of the present disclosure are firstly described.

Primary frequency modulation refers to an automatic control process, in which a control system of a wind turbine in the power grid automatically controls active power to increase or decrease in a case that a frequency of a power grid deviates from a rated value, so as to limit a change of the frequency of the power grid and maintain the frequency of the power grid to be stable. In a case that the frequency of the power gird increases, a function of primary frequency modulation requires the wind turbine to quickly reduce a load by using energy storage thereof. Conversely, the wind turbine quickly increases the load.

Secondary frequency modulation, also known as AGC, refers to that the turbine tracks the frequency in real time under an allowable adjustment deviation, by providing sufficient adjustable capacity and a certain adjustment rate, so as to meet a requirement on stable frequency of a system. The secondary frequency modulation can achieve frequency adjustment with zero error, and can monitor and adjust a tie-line power.

Hereinafter embodiments of the present disclosure are described in detail in conjunction with the drawings.

FIG. 1 shows a basic configuration of an example of a system for controlling power of a wind farm according to an embodiment of the present disclosure. The system for controlling power of the wind farm may be used to achieve participation of the wind farm in the primary frequency modulation function, the secondary frequency modulation function, a wave recording function during a frequency fault, and supporting functions such as related planning curve management and authority management of a system. The system for controlling power of the wind farm may be a field-level control system suitable for most direct-driven wind turbines, and may be placed in a booster station.

As shown in FIG. 1, the system for controlling power of the wind farm may include multiple wind turbine controllers 106 associated with multiple wind turbines 107, respectively, and a power control device 101. Optionally, the system for controlling power may further include a field operation workstation 102. All wind turbine controllers 106 may be connected (e.g., via an optical fiber 100) to the power control device 101. The power control device 101 may be connected to the grid-connection point 103. The grid-connection point 103 may be connected to a power grid 109 external to the wind farm. All the wind turbines 107 may be connected to a low voltage bus 104. The low voltage bus 104 may be connected to a high voltage bus 105 via a main transformer 108 of the wind farm. The high voltage bus 105 may be connected to the grid-connection point 103.

Each wind turbine controller 106 may be provided with a wind turbine primary frequency modulation module, configured to perform functions such as frequency modulation control and limiting power control of the wind turbine. In addition, the power control device 101 may be provided with a grid-connection point collection apparatus, capable to collect voltage, current and/or frequency of the grid-connection point 103 in real time, and the power control device 101 may determine whether the power grid is abnormal according to the collected data. In addition, the grid-connection point collection apparatus may monitor active power, reactive power, a frequency, and an operation state of the wind turbine, and perform functions such as triggering primary frequency, triggering an instruction for primary frequency of the wind turbine, and secondary frequency modulation.

Figure 2:
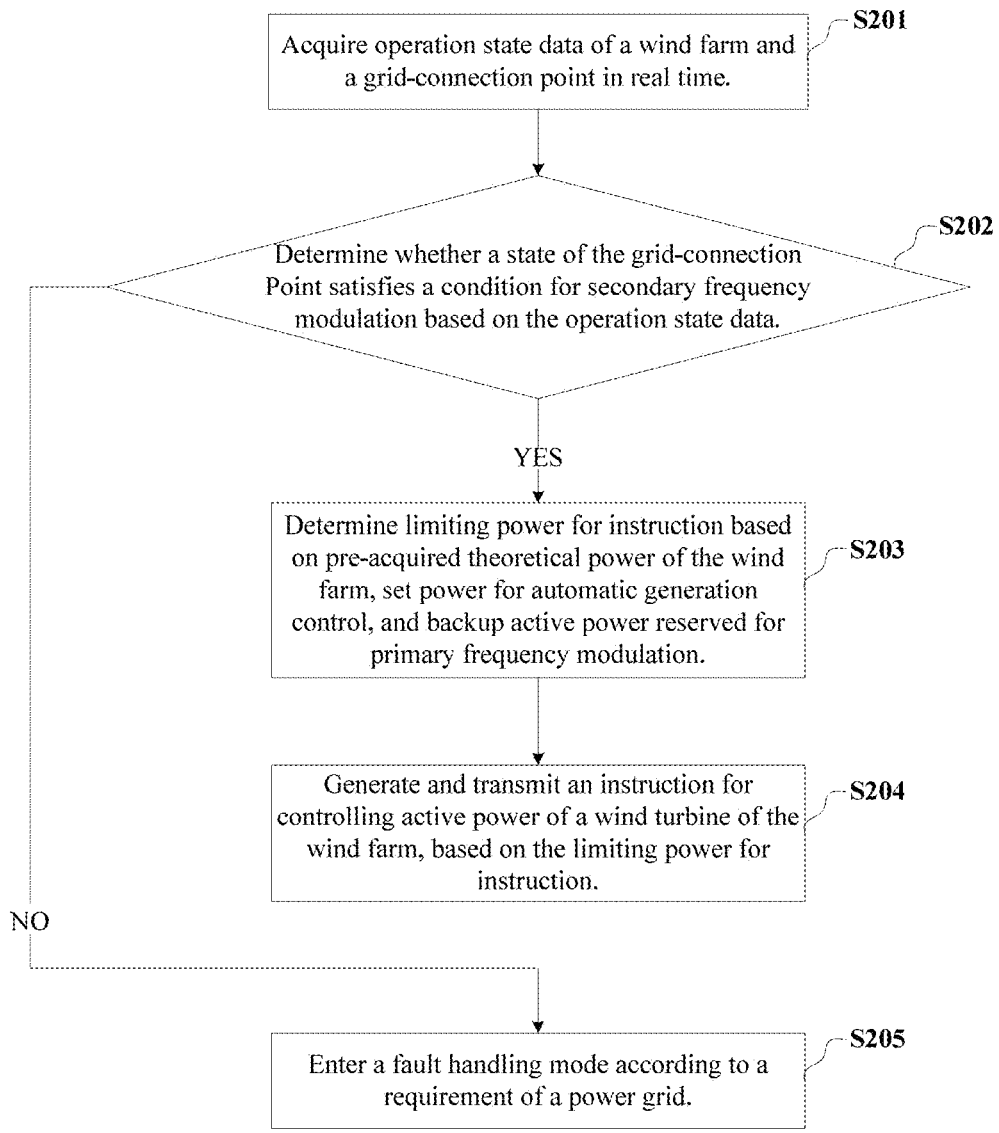
FIG. 2 is a flowchart of a method for controlling power of a wind farm according to an embodiment of the present disclosure.

A method for controlling power of the wind farm may be implemented based on the system for controlling power of the wind farm according to the above-described embodiment of the present disclosure. The method may include each step as shown in FIG. 2.

In step S201, operation state data of the wind farm and operation state data of a grid-connection point may be acquired in real time.

Specifically, the system for controlling power of the wind farm according to the embodiment of the present disclosure may collect a voltage signal and a current signal of the grid-connection point in real time, thereby calculating a frequency, active power and reactive power of a power grid in real time. The system for controlling power of the wind farm can communicate with each wind turbine to acquire the operation state data of the wind farm in real time (for example, connection state data of a communication line of the wind farm, operation state data of each wind turbine, etc.). The connection state data of the communication line of the wind farm may include connection state data of a communication line between the wind farm and the grid-connection point.

In step S202, it may be determined, based on the acquired operation state data, whether a state of the grid-connection point satisfies a condition for secondary frequency modulation. Step S203 is performed in a case that a state of the grid-connection point satisfies a condition for secondary frequency modulation. Step S205 is performed in a case that a state of the grid-connection point does not satisfy a condition for secondary frequency modulation.

Specifically, it may be determined that the state of the grid-connection point satisfies the condition for the secondary frequency modulation, in a case that it is determined that following conditions (a) to (c) are satisfied.

(a) The connection state data of the communication line of the wind farm indicates that communication is normal.

(b) A frequency at the grid-connection point is within a predetermined range.

(c) A voltage at the grid-connection point is within a predetermined range.

In step S203, limiting power for instruction may be determined based on pre-acquired theoretical power of the wind farm, set power for automatic generation control, and backup active power reserved for primary frequency modulation.

In step S204, an instruction for controlling active power of the wind turbine of the wind farm may be generated and transmitted based on the limiting power for instruction.

In step S205, a fault handling mode may be entered based on a requirement of the power grid.

According to an embodiment of the present disclosure, in one aspect, the active power of the wind farm can be controlled to meet the requirement on the primary frequency modulation, based on the backup active power reserved for the primary frequency modulation. In another aspect, the limiting power for instruction is determined with consideration of the backup active power reserved for the primary frequency modulation, the instruction for controlling active power of the wind turbine of the wind farm is generated and transmitted based on the limiting power for instruction, and thus the instruction does not interfere the primary frequency modulation. Namely, according to the embodiment of the present disclosure, the wind farm can output active power for the secondary frequency modulation on the basis of satisfying control of the primary frequency modulation, achieving coordinated control of the primary frequency modulation and the secondary frequency modulation. Therefore, a wind power station according to the embodiment of the present disclosure has a characteristic of fast frequency response, can improve system stability, and thereby can improve penetration of the wind turbines in the wind farm.

Figure 3:
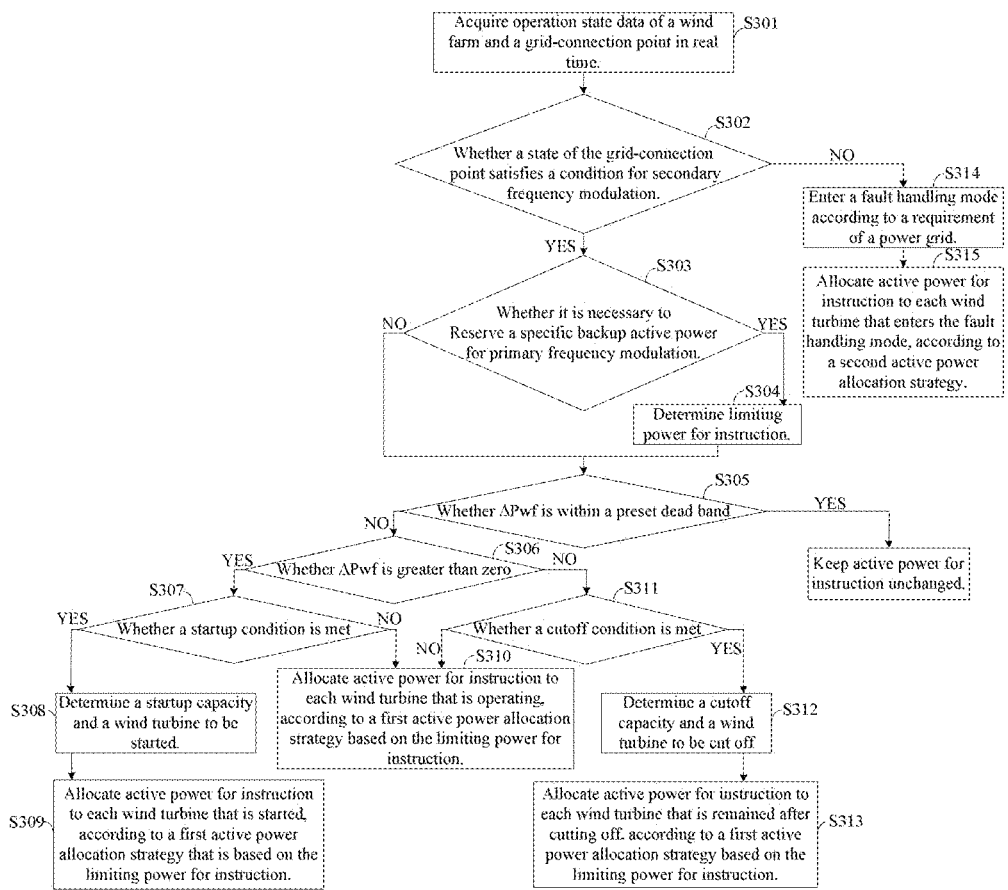
FIG. 3 is a flowchart of a method for controlling power of a wind farm according to another embodiment of the present disclosure.

Hereinafter a method for controlling power of a wind farm according to another embodiment of the present disclosure is described in detail with reference to a flowchart as shown in FIG. 3. The method may include each step as shown in FIG. 3.

In step S301, the operation state data of the wind farm and a grid-connection point may be acquired in real time.

In step S302, it may be determined, based on the acquired operation state data, whether a state of the grid-connection point satisfies a condition for secondary frequency modulation. Step S303 is performed in a case that a state of the grid-connection point satisfies a condition for secondary frequency modulation. Step S314 is performed in a case that a state of the grid-connection point does not satisfy a condition for secondary frequency modulation. The steps S301 and S302 are same as the steps S201 and S202 in FIG. 2, respectively, and are not described in detail herein.

In step S303, it may be determined whether backup active power needs to be reserved for primary frequency modulation. Step S304 is performed in a case that the determination is positive. Otherwise, step S305 is performed. For example, the backup active power reserved for primary frequency modulation may be 10% of Pn, specifically, and Pn is rated output active power.

In step S304, limiting power for instruction may be determined based on pre-acquired theoretical power of the wind farm, set power for automatic generation control, and backup active power reserved for primary frequency modulation. For example, it may be determined that the limiting power for instruction is equal to the set power for automatic generation control, in a case that a difference between the theoretical power and the set power for automatic generation control (i.e., set power for AGC) is greater than or equal to the backup active power (such as 10% of Pn). Namely, the limiting power for instruction=set power for AGC (for example, the limiting power for instruction is 50,000 watts, in a case that the theoretical power is 70,000 watts, the set power for AGC is 50,000 watts, and the backup active power is 10,000 watts). And, it may be determined that the limiting power for instruction is equal to a difference between the theoretical power and the backup active power, in a case that the difference between the theoretical power and the set power for AGC is less than the backup active power (such as 10% of Pn). Namely, the limiting power for instruction=the theoretical power−the backup active power (for example, the limiting power for instruction=55,000−10,000=45,000 watts, in a case that the theoretical power is 55,000 watts, the set power for AGC is 50,000 watts, and the backup active power is 10,000 watts).

In step S305, it may be determined whether $\Delta Pwf$ is within a preset dead band, where $\Delta Pwf$ represents a power difference between the limiting power for instruction and measured active power. Step S306 is performed in a case that $\Delta Pwf$ is not within a preset dead band. Active power for instruction for the wind turbine remains unchanged in a case that $\Delta Pwf$ is within a preset dead band.

Optionally, the measured active power PwfMeas outputted by the wind farm may be determined based on the operation state data of the grid-connection point, after the operation state data of the wind farm and the grid-connection point are acquired in real time (S301) and before it is determined whether the $\Delta Pwf$ is within the preset dead band (S305).

Under a condition that the wind farm needs to always provide the backup active power, $\Delta Pwf$ is a corrected value in a case that the theoretical power−the set power for AGC<the backup active power (such as 10% of Pn). Namely, $\Delta Pwf$=the limiting power for instruction−PwfMeas. In such case, $\Delta Pwf$ considers reserved limited power (i.e., the reserved backup active power). And, the limiting power for instruction is equal to the set power for AGC and $\Delta Pwf$=the set power for AGC−PwfMeas, in a case that the theoretical power−set power for AGC≥the backup active power (such as 10% of Pn).

Under a condition that the wind farm does not need to provide the backup active power, $\Delta Pwf$=the set power for AGC−PwfMeas.

In step S306, it may be determined whether ΔPwf is greater than zero. Step S307 is performed in a case that the determination is positive. Otherwise, step S311 is performed.

In step S307, it may be determined whether a startup condition is satisfied. Step S308 is performed in a case that the determination is positive. Otherwise, step S310 is performed. For example, the startup condition may include that a wind turbine in a shutdown state is in a condition for standby, and for each wind turbine in the shutdown state, ΔPwf is greater than backup power.

In step S308, a wind turbine to be started and a startup capacity may be determined. For example, that the wind turbine to be started is determined may include a following step. A startup priority is set for each wind turbine based on a state coefficient of the corresponding wind turbine. That the startup capacity is determined may include a following step. The backup power of each wind turbine to be started is determined, where the backup power is not lower than the backup active power. In practice, the backup power of all turbines after starting may reserve a certain capacity, where a reference value is 10% of Pn.

According to an embodiment of the present disclosure, the state coefficient of the wind turbine may be determined in a following manner (where a coefficient plus a suffix of "0" represents an influence factor of the corresponding coefficient, and the corresponding coefficient does not affect power allocation of the wind turbine in a case that the influence factor is zero).

(1) A wind energy state coefficient $K_{windquality}$ of a current wind turbine is determined according to equation 1. A level (a turbulence level) is determined according to a current wind resource state. The level WindQuality is specified by the power control device 101 from a master control point.

$$K_{windquality} = K_{windquality0} * WindQuality \quad \text{Equation 1:}$$

(2) A power generation amount coefficient $K_{powerenergy}$ of the current wind turbine is determined according to equation 2. It is determined whether to participate in the secondary frequency modulation according to a power generation amount of the current wind turbine. A target is to balance the power generation amount among each wind turbine.

$$K_{powerenergy} = K_{powerenergy0} \times \left(1 - \frac{WT_{powerenergy}}{WF_{powerenergy}}\right) \quad \text{Equation 2}$$

$WT_{powerenergy}$ represents the power generation amount of the current wind turbines, $WF_{powerenergy}$ represents a total power generation amount of all wind turbines;

(3) A total-working-time coefficient $K_{workingtime}$ of the current wind turbine is determined according to equation 3. It is determined whether to participate in the secondary frequency modulation according to total working time of the current wind turbine. A target is to balance power-generating time among each wind turbine.

$$K_{workingtime} = K_{workingtime0} \times \left(1 - \frac{WT_{workingtime}}{WF_{workingtime}}\right) \quad \text{Equation 3}$$

$WT_{workingtime}$ represents the total working time of the current wind turbine, and $WF_{workingtime}$ represents total working time of all wind turbines.

(4) A fault-time coefficient $K_{faulttime}$ of the current wind turbine is determined according to equation 4. It is determined whether to participate in the secondary frequency modulation according to fault time of the current wind turbine. A target is to balance total fault time among each wind turbine (an influence of the coefficient is weakened by $K_{faulttime0}$).

$$K_{faulttime} = K_{faulttime0} \times \left(1 - \frac{WT_{faulttime}}{WF_{faulttime}}\right) \quad \text{Equation 4}$$

$WT_{faulttime}$ represents the total fault time of the current wind turbine, and $WF_{faulttime}$ represents total fault time of all wind turbines;

(5) A total times-of-startups coefficient $K_{starttime}$ of the current wind turbine is determined according to equation 5. It is to determine whether to participate in the secondary frequency modulation according to a total quantity of startups of the current wind turbine. A target is to balance total quantity of startups among each wind turbine (an influence of the coefficient is weakened by $K_{starttime0}$).

$$K_{starttime} = K_{starttime0} \times \left(1 - \frac{WT_{starttime}}{WF_{starttime}}\right) \quad \text{Equation 5}$$

$WT_{starttime}$ represents the total quantity of startups of the current wind turbine, and $WF_{starttime}$ represents total quantity of startups of all wind turbines;

(6) The state coefficient $WT_{coefficient}$ of the current wind turbine is calculated according to equation 6.

$$WT_{coefficient} = K_{windquality} + K_{powerenergy} + K_{workingtime} + K_{faulttime} + K_{starttime} \quad \text{Equation 6:}$$

In step S309, the active power for instruction may be allocated to each wind turbine that is started according to a first active power allocation strategy that is based on the limiting power for instruction, after the wind turbine to be started is started. For example, for each non-faulty standard wind turbine (N1-type wind turbine) that is started, theoretical power of the non-faulty standard wind turbine may be allocated as the active power for instruction to each non-faulty standard wind turbine that is started. Namely, each non-faulty standard wind turbine that is started operates in a maximum power point tracking (Maximum Power Point Tracking, MPPT) mode. For each non-faulty non-standard wind turbine (N2-type wind turbine) that is started, the active power for instruction Pwtcmd of a non-faulty non-standard wind turbine may be determined and allocated based on a sum P2 of theoretical power of all non-faulty non-standard wind turbines that are started, theoretical power Pwt of the non-faulty non-standard wind turbine, a sum P1 of theoretical power of all non-faulty standard wind turbines, and the limiting power for instruction Pref. For example, there may be Pwtcmd=(Pref−P1)×Pwt/P2.

In step S310, the active power for instruction may be allocated to each operating wind turbine according to the first active power allocation strategy that is based on the limiting power for instruction.

In step S311, it may be determined whether a cutoff condition is satisfied. Step S312 is performed in a case that it is determined that the cutoff condition is satisfied. Otherwise, the step S310 is performed. For example, the cutoff condition may include the difference between the theoretical power and the set power for AGC is greater than preset redundant active power (x % of Pn, and x is adjustable where a default value is 20).

In step S312, a wind turbine to be cut off and a cutoff capacity may be determined. For example, that the wind turbine to be cut off is determined may include a following step. A shutdown priority is determined for each wind turbine based on a state coefficient of the corresponding wind turbine. That the cutoff capacity is determined may include following steps. Backup power of each remaining wind turbines in case of shutting down each wind turbine to be cut off is determined, and maximum cutoff residual power of all the remaining wind turbines is determined based on the theoretical power, the limiting power for instruction, and the preset redundant active power.

The state coefficient $WT_{coefficent}$ of the wind turbine may be determined according to the aforementioned equation 6, which is not be described again herein.

The maximum cutoff residual power Pcutoffmax of all the remaining wind turbines may be set as follows. Theoretical power−(limiting power for instruction+x % Pn), where x can be adjusted, and the default value is 20.

According to an embodiment of the present disclosure, the cutoff may be performed in a case that the following three principles are satisfied.

First, working time of the wind turbine is greater than an adjustable preset value Tstartup, in order to avoid frequent startup and shutdown of a single wind turbine;

Second, a non-standard wind turbine with a greater WTcoefficient has a priority to be cut off.

Third, the total cutoff capacity is not greater than Pcutoffmax.

In step S313, the active power for instruction may be allocated to each wind turbine remained after the cutting off, according to the first active power allocation strategy that is based on the limiting power for instruction, after the wind turbine to be cut off is cut off. For example, for each non-faulty standard wind turbine (N1-type wind turbine) remained after the cutting off, the theoretical power of the non-faulty standard wind turbine may be allocated as the active power for instruction to each non-faulty standard wind turbine remained after the cutting off. Namely, each non-faulty standard wind turbine remained after the cutting off is operated in the MPPT mode. For each non-faulty non-standard wind turbine (N4-type wind turbine) remained after the cutting off, the active power for instruction Pwtcmd1 of a non-faulty non-standard wind turbine may be determined and allocated based on the set power for AGC, a sum P1 of theoretical powers of all non-faulty standard wind turbines, theoretical power Pwt1 of the non-faulty non-standard wind turbine, a sum P4 of theoretical powers of all non-faulty non-standard wind turbines remained after the cutting off. For example, there may be Pwtcmd1=(set power for AGC−P1)×Pwt1/P4.

In step S314, a fault handling mode may be entered according to a requirement of the power grid.

In step S315, the active power for instruction may be allocated to each wind turbine that enters the fault handling mode, according to a second active power allocation strategy. For example, the second active power allocation strategy may include setting a startup process and a shutdown process according to a specific guideline for the power grid.

According to an embodiment of the present disclosure, a non-faulty wind turbine may be determined after the active power for instruction is allocated in the step S309, S310, S313 or S315. For example, the non-faulty wind turbine may be determined according to a condition that communication is normal and RunFlag=5, where RunFlag is a value of a running flag provided by the master controller.

In addition, according to an embodiment of the present disclosure, it may be required to meet following requirements, in a case that the active power for instruction is allocated in the step S309, S310, S313 or S315. The requirements are: a period between two instructions for the allocation among the wind turbines is greater than an instruction period of the secondary frequency modulation; an increase of the active power for instruction in one period is not greater than the backup active power reserved for the primary frequency; and the wind turbine is non-standard and non-faulty.

Further, the step S204 in FIG. 2 may include the steps S305 to S313 in FIG. 3, according to an embodiment of the present disclosure.

Figure 4:
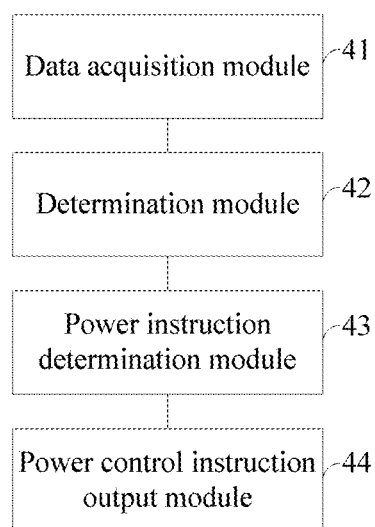
FIG. 4 is a block diagram of a device for controlling power of a wind farm according to an embodiment of the present disclosure.

As shown in FIG. 4, a device for controlling power of a wind farm is further provided according to the present disclosure. The device may include a data acquisition module 41, a determination module 42, a power instruction determination module 43, and a power control instruction output module 44.

The data acquisition module 41 may acquire, in real time, operation state data of the wind farm and operation state data of a grid-connection point. The determination module 42 may determine, according to the operation state data, whether a state of the grid-connection point satisfies a condition for secondary frequency modulation. The power instruction determination module 43 may determine limiting power for instruction, based on pre-acquired theoretical power of the wind farm, set power for automatic generation control, and backup active power reserved for primary frequency modulation, in a case that the determination module 42 determines that the state of the grid-connection point satisfies the condition for the secondary frequency modulation. The power control instruction output module 44 may generate and transmit an instruction for controlling active power of a wind turbine of the wind farm, based on the limiting power for instruction.

Based on the same inventive concept, a storage medium is further provided according to the present disclosure. The storage medium stores a computer program corresponding to the method for controlling power of the wind farm according to the aforementioned embodiment of the present disclosure.

The aforementioned embodiments of the present disclosure may be implemented by firmware, hardware, executing software or computer code that can be stored in a recording medium, or executing computer codes that are downloaded via a network, originally stored on a remote recording medium or a non-transitory machine readable medium, and to be stored on a local recording medium. Thereby, the methods described herein may be implemented via the software stored in a recording medium by using a general computer or a specific processor, or implemented by pro-grammable or specific hardware (such as an ASIC or an FPGA). It should be understood in the art that a computer, a processor, a microprocessor controller or programmable hardware may include memory components (such as RAM, ROM, flash memory, etc.) that can store or receive software or computer codes. The software or the computer codes implements the method described herein when accessed and executed by the computer, the processor or the hardware. Any of the functions and steps provided in the drawings may be implemented in hardware, software, or a combination of both.

Hereinabove described is only some of the embodiments of the present disclosure. It should be noted that a number of variations and modifications may be made by those skilled in the art without departing from the principles of the present disclosure, and such variations and modifications are also considered to be within the scope of the present disclosure.

The invention claimed is:

1. A method for controlling power of a wind farm, comprising:
   acquiring, in real time, operation state data of the wind farm and operation state data of a grid-connection point;
   determining, according to the operation state data of the wind farm and the operation state data of the grid-connection point, whether a state of the grid-connection point satisfies a condition for secondary frequency modulation;
   determining limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation, wherein the determining the limiting power for instruction comprises:
      determining a difference between the theoretical power and the set power for automatic generation control is less than the backup active power; and
      determining that the limiting power for instruction is equal to a difference between the theoretical power and the backup active power when the difference between the theoretical power and the set power for automatic generation control is less than the backup active power;
   generating and transmitting an instruction for controlling active power of a wind turbine of the wind farm based on the limiting power for instruction.

2. The method for controlling power according to claim 1, wherein the determining the limiting power for instruction further comprises:
   determining a difference between the theoretical power and the set power for automatic generation control is greater than or equal to the backup active power; and
   determining that the limiting power for instruction is equal to the set power for automatic generation control when difference between the theoretical power and the set power for automatic generation control is greater than or equal to the backup active power.

3. The method for controlling power according to claim 2, further comprising:
   determining, based on the operation state data of the grid-connection point, measured active power outputted by the wind farm;
   determining whether a power difference between the limiting power for instruction and the measured active power is greater than zero, in a case that the power difference is not within a preset dead band;
   determining whether a startup condition is satisfied, in a case that it is determined that the power difference is greater than zero;
   determining a wind turbine to be started and a startup capacity, in a case that it is determined that the startup condition is satisfied;
   allocating active power for instruction to each wind turbine that is started, according to a first active power allocation strategy that is based on the limiting power for instruction, after starting the wind turbine to be started.

4. The method for controlling power according to claim 2, wherein:
   the operation state data of the wind farm comprises communication state data of a communication line of the wind farm and operation state data of each wind turbine;
   the operation state data of the grid-connection point comprises voltage, current and/or frequency of the grid-connection point.

5. The method for controlling power according to claim 1, further comprising:
   determining, based on the operation state data of the grid-connection point, measured active power outputted by the wind farm;
   determining whether a power difference between the limiting power for instruction and the measured active power is greater than zero, in a case that the power difference is not within a preset dead band;
   determining whether a startup condition is satisfied, in a case that it is determined that the power difference is greater than zero;
   determining a wind turbine to be started and a startup capacity, in a case that it is determined that the startup condition is satisfied;
   allocating active power for instruction to each wind turbine that is started, according to a first active power allocation strategy that is based on the limiting power for instruction, after starting the wind turbine to be started.

6. The method for controlling power according to claim 5, wherein allocating the active power for instruction to each wind turbine that is started comprises:
   allocating theoretical power of a non-faulty standard wind turbine as the active power for instruction, to each non-faulty standard wind turbine that is started;
   determining the active power for instruction of a non-faulty non-standard wind turbine, for each non-faulty non-standard wind turbine that is started, based on a sum of theoretical power of all non-faulty non-standard wind turbines that are started, theoretical power of the non-faulty non-standard wind turbine, a sum of theoretical power of all non-faulty standard wind turbines, and the limiting power for instruction; and
   allocating the active power for instruction of the non-faulty non-standard wind turbine, to the non-faulty non-standard wind turbine.

7. The method for controlling power according to claim 5, wherein the startup condition comprises: a wind turbine in a shutdown state is in a condition for standby, and the power difference is greater than backup power of the wind turbine in the shutdown state; and
   wherein:
      determining the wind turbine to be started comprises: setting, for each wind turbine, a startup priority based on a state coefficient; and/or
      determining the start capacity comprises: determining the backup power of each the wind turbines to be started, wherein the backup power is not lower than the backup active power.

8. The method for controlling power according to claim 5, wherein:
   determining whether a cutoff condition is met, in a case that it is determined that the power difference is less than or equal to zero;
   determining a wind turbine to be cut off and a cutoff capacity, in a case that it is determined that the cutoff condition is satisfied;

allocating the active power for instruction to each wind turbine that is remained after cutting off, according to the first active power allocation strategy that is based on the limiting power for instruction, after cutting off the wind turbine to be cut off.

9. The method for controlling power according to claim 8, wherein the cutoff condition comprises: the difference between the theoretical power and the set power for automatic generation control is greater than preset redundant active power; and
wherein:
determining the wind turbine to be cut off comprises: setting, for each wind turbine, a shutdown priority based on a state coefficient; and/or
determining the cutoff capacity comprises: determining backup power of each wind turbines that are remained in case of shutting down each of the wind turbine to be shut down, and determining cutoff maximum residual power of all the wind turbines that are remained based on the theoretical power of the wind farm, the limiting power for instruction, and a preset redundancy active power.

10. The method for controlling power according to claim 8, wherein allocating the active power for instruction to each wind turbine that is remained after cutting off comprises:
allocating theoretical power of a non-faulty standard wind turbine as the active power for instruction, to each non-faulty standard wind turbine that is remained after cutting off,
determining the active power for instruction of a non-standard non-faulty wind turbine, for each non-standard non-faulty wind turbine, based on the set power for automatic generation control, a sum of theoretical power of all non-faulty standard wind turbines, theoretical power of the non-standard non-faulty wind turbine, a sum of theoretical power of all non-standard non-faulty wind turbines that are remained after cutting off; and
allocating the active power for instruction of the non-standard non-faulty wind turbine, to the non-standard non-faulty wind turbine.

11. The method for controlling power according to claim 1, wherein:
the operation state data of the wind farm comprises communication state data of a communication line of the wind farm and operation state data of each wind turbine;
the operation state data of the grid-connection point comprises voltage, current and/or frequency of the grid-connection point.

12. The method for controlling power according to claim 1, further comprising:
entering a fault handling mode according to a requirement of a power grid, and allocating active power for instruction to each wind turbine that enters the fault handling mode according to a second active power allocation strategy, in a case that it is determined that the state of the grid-connection point does not satisfy the condition for the secondary frequency modulation.

13. A non-transitory storage medium, storing a computer program corresponding to the method for controlling power of the wind farm according to claim 1.

14. A device for controlling power of a wind farm comprising:
a memory; and
at least one processor coupled to the memory and configured to:
acquire, in real time, operation state data of the wind farm and operation state data of a grid-connection point;
determine, according to the operation state data of the wind farm and the operation state data of the grid-connection point, whether a state of the grid-connection point satisfies a condition for secondary frequency modulation;
determine limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation, wherein the at least one processor is configured to determine the limiting power instruction by:
determining a difference between the theoretical power and the set power for automatic generation control is less than the backup active power; and
determining that the limiting power for instruction is equal to a difference between the theoretical power and the backup active power when the difference between the theoretical power and the set power for automatic generation control is less than the backup active power;
generate and transmit an instruction for controlling active power of a wind turbine of the wind farm, based on the limiting power for instruction.

15. The device for controlling power of a wind farm of claim 14, wherein the at least one processor is configured to determine the limiting power instruction by:
determining a difference between the theoretical power and the set power for automatic generation control is greater than or equal to the backup active power; and
determining that the limiting power for instruction is equal to the set power for automatic generation control when the difference between the theoretical power and the set power for automatic generation control is greater than or equal to the backup active power.

16. A system for controlling power of a wind farm, comprising:
a power control device; and
a plurality of wind turbine controllers, associated with a plurality of wind turbines, respectively, wherein:
each of the plurality of wind turbine controllers is connected to the power control device;
the power control device is connected to a grid-connection point of the wind farm; and
the power control device is configured to:
acquire, in real time, operation state data of the wind farm and operation state data of a grid-connection point;
determine, according to the operation state data of the wind farm and the operation state data of the grid-connection point, whether a state of the grid-connection point satisfies a condition for secondary frequency modulation;
determine limiting power for instruction, based on pre-acquired theoretical power of the wind farm, set power for automatic generation control, and backup active power reserved for primary frequency modulation, in a case that it is determined that the state of the grid-connection point satisfies the condition for the secondary frequency modulation, wherein the power control device is configured to determine the limiting power for instruction by:

determining a difference between the theoretical power and the set power for automatic generation control is less than the backup active power; and determining that the limiting power for instruction is equal to a difference between the theoretical power and the backup active power when the difference between the theoretical power and the set power for automatic generation control is less than the backup active power;

generate and transmit an instruction for controlling active power of one of the plurality of wind turbines in the wind farm, based on the limiting power for instruction.

17. The system for controlling power of a wind farm of claim 16, wherein the power control device is configured to determine the limiting power for instruction by:

determining a difference between the theoretical power and the set power for automatic generation control is greater than or equal to the backup active power; and determining that the limiting power for instruction is equal to the set power for automatic generation control when difference between the theoretical power and the set power for automatic generation control is greater than or equal to the backup active power.

\* \* \* \* \*